United States Patent [19]

Su et al.

[11] Patent Number: 5,612,806
[45] Date of Patent: Mar. 18, 1997

[54] ACKNOWLEDGEMENT USING SUBCARRIER MULTIPLEXED TONES

[75] Inventors: Shing-Fong Su, Southboro; Robert Olshansky, Wayland, both of Mass.

[73] Assignee: GTE Laboratories Incorporated, Waltham, Mass.

[21] Appl. No.: 258,148

[22] Filed: Jun. 10, 1994

Related U.S. Application Data

[63] Continuation-in-part of Ser. No. 100,513, Jul. 30, 1993, abandoned.

[51] Int. Cl.$^6$ .................................................... H04J 14/02
[52] U.S. Cl. ........................... 359/125; 359/133; 359/165
[58] Field of Search ............................ 370/121, 71, 124, 370/76, 95.1; 359/124, 125, 133, 165, 136

[56] References Cited

U.S. PATENT DOCUMENTS

| | | | |
|---|---|---|---|
| 4,220,869 | 5/1982 | Robieux | 359/125 |
| 4,710,914 | 12/1987 | Robieux | 359/125 |
| 5,229,995 | 7/1993 | Strawczynski | 370/95.1 |
| 5,289,302 | 2/1994 | Eda | 370/76 |

*Primary Examiner*—Leslie Pascal
*Attorney, Agent, or Firm*—Leonard C. Suchyta

[57] ABSTRACT

Subcarrier multiplexed acknowledgment tones are used for contention recovery in multiple-access WDM networks with basedband data packets and subcarrier multiplexed control headers. Upon receiving a data message from another node, the receiving node sends a subcarrier acknowledgement tone to the transmitter thus informing the transmitting node that the message has been received. The throughput of the network is significantly improved. In an alternative embodiment, an acknowledgement is sent from the receiver by impressing a data message on a subcarrier.

2 Claims, 3 Drawing Sheets

ACKNOWLEDGEMENT USING SUBCARRIER MULTIPLEXED TONES

RELATED APPLICATIONS

The present invention is a continuation-in-part of U.S. Ser. No. 08/100,513, filed Jul. 30, 1993, now abandoned, having a co-inventor with an obligation to assign to the same assignee as this application. U.S. Ser. No. 08,/100,513, is entitled "Wavelength Division Multiplexed Broadband Network with Subcarrier Multiplexed Control Channel" and is incorporated by reference herein.

FIELD OF THE INVENTION

The present invention relates generally to optical wavelength division multiplexed communications networks and more specifically to optical wavelength division multiplexed communications networks using a subcarrier multiplexed tone for acknowledgement.

BACKGROUND OF THE INVENTION

In any multiple-access WDM network using wavelength-tunable receivers, a control channel is required to provide the receiving node with information as to which wavelengths carry the incoming messages. One approach for accomplishing this function uses a common signalling wavelength shared by all nodes. However, this approach requires a second DFB laser to transmit the control headers, substantially increasing the cost of the opto-electronics per node. Moreover, as the number of nodes increases, the density of the control channels grows proportionally creating severe contention for the control channels. Additionally, the data rate of the control channels must increase as the density of the traffic increases, forcing the control channel to transmit in the gigabits/second range. One technique to avoiding these difficulties is the use of subcarrier multiplexed (SCM) headers as the control channels S. F. Su and R. Olshansky, "Performance of WDMA networks with baseband data packets and SCM control channels," Proceedings ECOC '92, pp. 585–588, September 1992. This approach eliminates the need for a second DFB laser at each mode. It also alleviates the control channel contention problem by channelizing the control headers. As such, the control channel data rate is kept low, typically in the 10–100 Mb/s range, making it possible to process the control information with low cost silicon technology. To maximize network throughput, it is desireous for the receiving node to acknowledge and to confirm a successful transmission by the transmitting node. A common wavelength or control channels on subcarriers can be used for acknowledgment. The former approach increases cost per node and the latter increases possible contention between control channels and acknowledgments.

OBJECTS OF THE INVENTION

Accordingly, it is a primary object of this invention to obviate the above noted and other disadvantages of the prior art.

It is a further object of the invention to provide for an opto-electronic communications network allowing for increased contention recovery.

It is a yet further object of the invention to provide for an opto-electronic communications network allowing for increased contention recovery by providing that the receiver of a data message sent an acknowledgement to the sender as a subcarrier multiplexed tone.

It is a yet further object of the invention to provide for an opto-electronic communications network allowing for increased contention recovery by providing that the receiver of a data message sent an acknowledgement to the sender as a data message on a subcarrier unique to the sender.

SUMMARY OF THE INVENTION

In one aspect of the invention the throughput of multiple-access WDM network is improved by using subcarrier multiplexed acknowledgment tones for contention recovery. Acknowledgement tones are pure subcarriers carrying no data. Without contention recovery, the theoretical maximum average throughput per node is limited to 0.5 as shown by C. S. Li, M. S. Chen, and F. K. Tong, "Architecture and protocols of a passive optical packet-switched metropolitan/wide area network using WDMA," IBM Research Report RC 17857, March 1992. Using subcarrier acknowledgment tones for contention recovery, the data offered load per node can be effectively greater than 1, and the maximum average throughput per node is no longer limited to 0.5. Further, the frequency band of the acknowledgment tones is separate from that of the control channel subcarriers, thus eliminating concerns regarding contention between control channels.

In another aspect of the invention, acknowledgement from a receiver node are provided by impressing a short data response on an assigned subcarrier to the transmitting node.

DETAILED DESCRIPTION OF THE INVENTION

Figure 1:
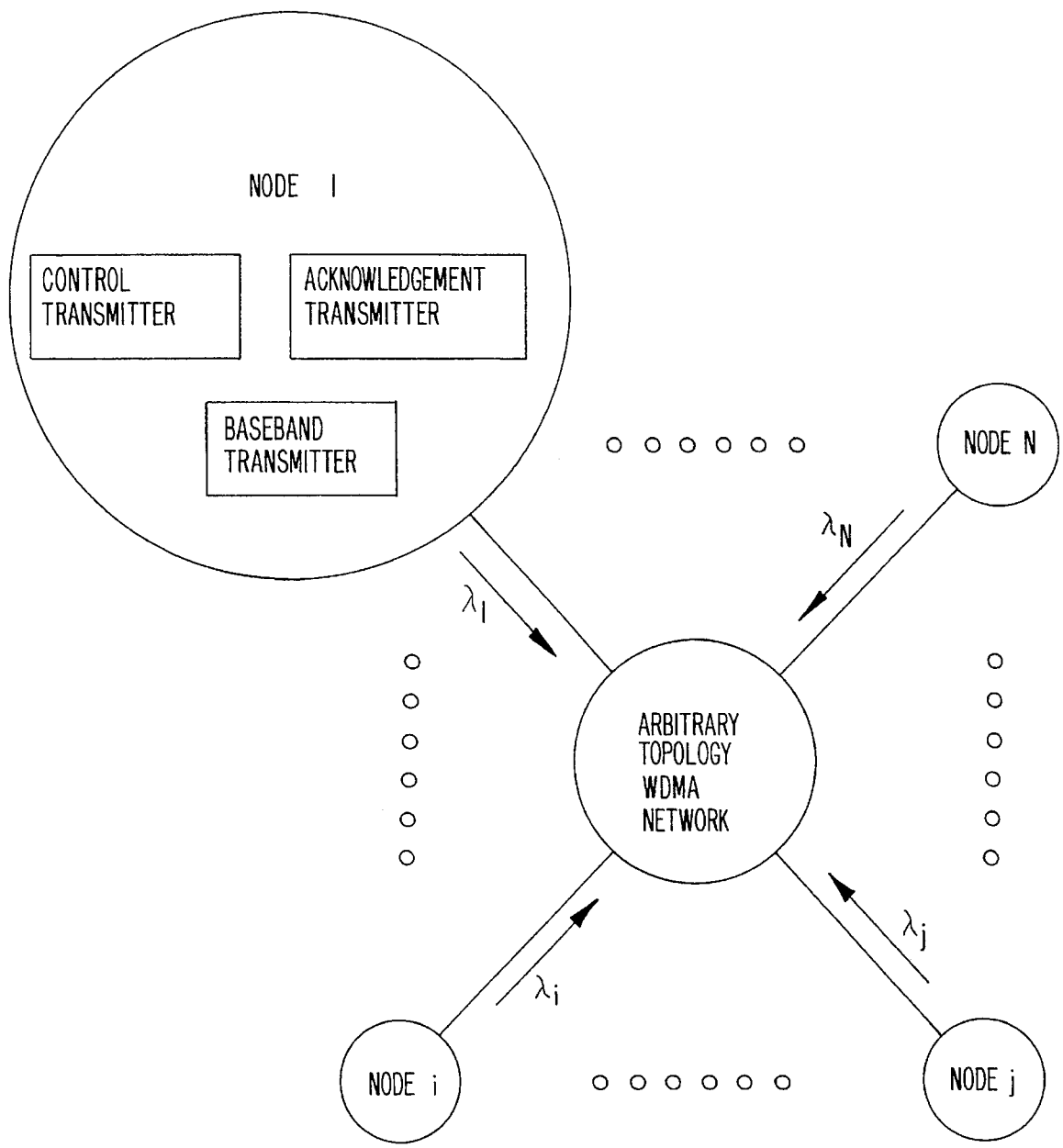
FIG. 1. depicts a multiple-access WDM network with M nodes.

A multiple-access WDM network with arbitrary topology is shown in FIG. 1 with M access nodes. Each node comprises a fixed-wavelength optical transmitter and one tunable optical receiver. The transmitter at each node transmits messages on a separate wavelength $\lambda_i$ (i=1.2, ..., M) which is uniquely allocated to that node. The tunable optical receiver can receive any one of the M wavelengths. Each node is capable of transmitting messages at its designated wavelength and simultaneously receiving messages at any wavelength.

To transport a message, the transmitting node must inform its intended receiving node to tune to the right wavelength. In addition, the receiving node must send an acknowledgment back to the transmitting node to confirm a successful reception. Subcarriers are used to achieve these functions without adding a separate wavelength. The control headers are transmitted using Q subcarriers with frequencies $f_i$, i=1,2 ... Q and transmit the acknowledgments using M subcarrier tones with frequencies $v_i$, i=1,2, ...,M, where Q<M. While each node may transmit any of the above subcarriers, it may only accept two unique subcarriers, the one assigned for the control header and the one assigned for acknowledgment. Node j only accepts control header and acknowledgement tone subcarriers at frequencies $f_j$ and $v_j$ respectfully. Control header subcarriers are modulated subcarriers carrying control header information. Acknowledgement tone s are pure subcarriers carrying no data. A control header subcarrier may be shared by up to q receiving nodes with 1<q<M, a separate subcarrier acknowledgment tone i s assigned to each individual node.

Since the data rate associated with a control header is approximately 10–100 Mb/s, silicon VLSI transceiver chips used for Fiber Data Distribution Interface (FDDI) transmission are commercially available and can provide the needed functionality. FDDI uses 4B/5B encoding, operates at 125 Mbaud, and has a maximum data transfer rate of 100 Mb/s. Using QPSK or differential QPSK coding, a bandwidth efficiency of at least 1 bit/sec/Hz can be achieved. Thus eight 125 Mbaud control channels could be placed in each GHz of available bandwidth. With a baseband data rate of 2.5 Gb/s, then 8 subcarriers could be placed in the 3.0–4.0 GHz band. If more control channels are required, they may be placed at higher frequencies. Each acknowledgment tone occupies a bandwidth of a few kHz. For a network of 100 nodes, the frequency band for the acknowledgment tones is a few MHz.

Figure 2:
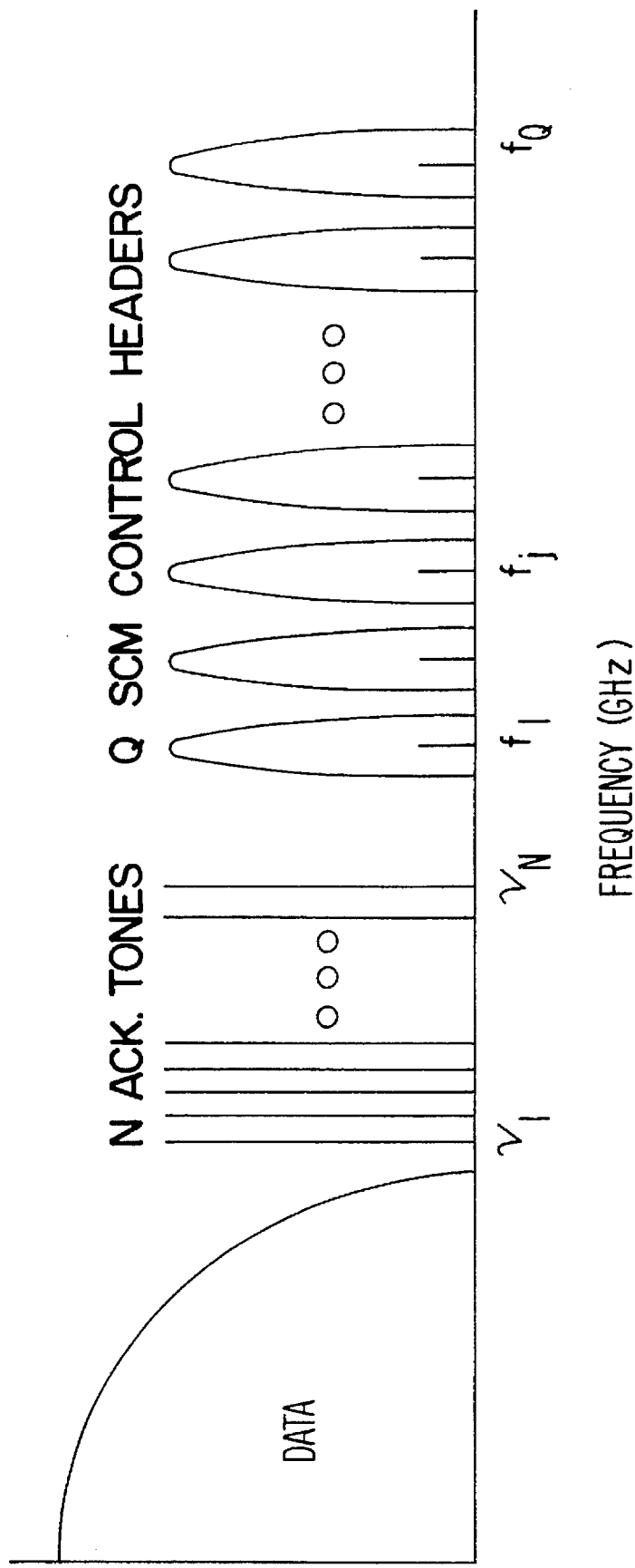
FIG. 2. depicts a frequency plan for SCM control headers and acknowledgment tones according to the instant invention.

An exemplary representation of the frequency plan for the SCM control headers and acknowledgment tones is shown in FIG. 2. As is shown, the acknowledgment tones may be placed between the data and the control header frequency bands. However, in an alternative embodiment the SCM acknowledgment tones may also be placed at any frequency band, provided that they do not coincide with the data or the SCM control headers.

The operation and protocol of the network is now described. A node i desiring to transmit a message which consists of a control header plus a data packet to node j, it will transmit the control header on subcarrier $f_j$ using wavelength $\lambda_i$, and immediately begin transmitting the baseband data packet using the same wavelength. At the same time its SCM receiver listens to detect the acknowledgment tone at subcarrier frequency $v_i$. If the control header experiences no collision at node j, node i will receive the acknowledgment tone $v_i$ from node j after a round-trip propagation time. Node i completes transmission of the data packet and then removes the message from its send queue.

However, if node i, after a round-trip propagation of the message on the ring, does not receive an acknowledgment tone at wavelength $v_i$ from node j, indicating that the control header has experienced a collision, the sending node has the option of immediately retransmitting the message or transmitting a new message regardless of whether the earlier data packet is completely transmitted or not. At node j, the SCM receiver will only accept the electrical signals in the frequency bands of subcarrier $f_j$ and $v_j$. The control header processor following the SCM receiver will read the incoming control header. It the incoming control header experiences no collision, node j will send the acknowledgment tone $v_i$ to node i. At the same time, it will also instruct its receiver to receive the incoming wavelength $\lambda_i$. If the incoming control header experiences a collision, node j will not send any acknowledgment tone to node i, prompting node i to retransmit a message. Other nodes in the network may carry out their operations simultaneously and independently.

For a multiple-access WDM network without global synchronization across the network, each node in the network is allowed to transmit messages at will with no regard for other nodes. The throughput per node can be derived as $$S_j=\{r^2G/[M(1+r)]\}\exp(-2G/Q)/[1+(rG/M)\exp(-2G/Q)], \quad (1)$$

where r is the normalized data packet length defined as the ratio of data packet length to control header length in terms of time, G is the aggregate average transmission attempts per time slot for the entire network, M is the number of nodes, and Q is the number of subcarriers for control headers. A time slot is defined here as a control header length in terms of time. With the data offered load to each node defined as $G_d$=rG/M, (1) can be written as $$S_j=[rG_d/(1+r)]\exp(-2MG_d/rQ)/[1+G_d\exp(-2MG_d/rQ)]. \quad (2)$$

Figure 3:
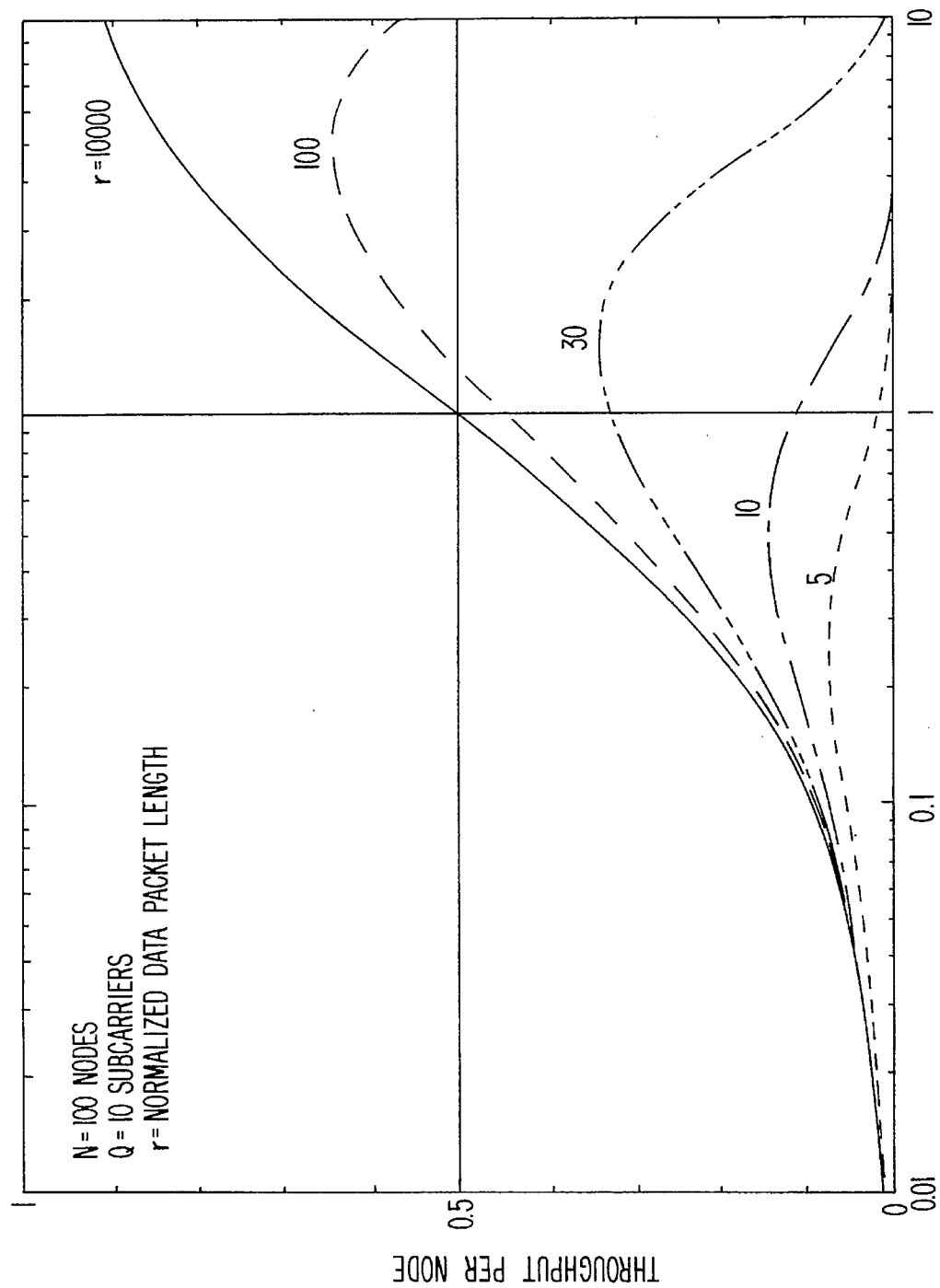
FIG. 3. shows throughput per node versus data offered load of a network with 100 access nodes and 10 subcarriers for various data packet lengths when employing the instant invention in a multiple-access WDM network.

For connectionless transmission without acknowledgments, a message from a node must be completely transmitted before the next message can be transmitted from the same node. This means that the value of G cannot be larger than M/r per time slot, and hence the maximum data offered load $G_d$ is limited to 1. With $G_d$=1 and r very large, (2) has a maximum value of 0.5. In the acknowledgement mechanism proposed here, an access node will immediately retransmit a message (old or new) if it does not receive an acknowledgment tone after a round-trip propagation time regardless of whether the earlier data packet is completely transmitted or not. As such, the value of G can be larger than M/r per time slot, and the value of $G_d$ is no longer limited to 1. That is, the data offered load could effectively be greater than 1. This will substantially increase the throughput of the network. For illustration, (2) as a function of the data offered load is plotted in FIG. 3 for a network with 100 access nodes, 10 subcarriers for control headers, and various data packet length. FIG. 3 clearly shows that for longer data packets, the throughput is greater than 0.5 for G>1.

While there has been shown and described what is at present considered the preferred embodiment of the invention it will be obvious to those skilled in the art that various changes and modifications may be made therein without departing from the invention as defined by the appended claims.

What is claimed is:

1. An opto-electronic system, having a plurality of nodes $N_i$ where i=1, . . . ,n, for sending message from one node $N_i$ to another node $N_j$ where j=1, . . . ,n j not equal to i comprising:

a transmitter means residing in said node $N_i$ for transmitting a control channel signal to node $N_j$ which is centered at frequency $f_j$;

a baseband transmitter means for transmitting a message from node $N_i$ to node $N_j$ using an optical signal at wavelength $\lambda_i$;

an acknowledgement means residing at node $N_j$ for notifying node $N_i$ that said message is received;

whereby said acknowledgement means is a subcarrier multiplexed tone unique to node $N_i$.

2. An opto-electronic system, having a plurality of nodes $N_i$ where i=1, . . . ,n, for sending message from one node $N_i$ to another node $N_j$ where j=1, . . . ,n j not equal to i comprising:

a transmitter means residing in said node $N_i$ for transmitting a control channel signal to node $N_j$ which is centered at frequency $f_j$;

a baseband transmitter means for transmitting a message from node $N_i$ to node $N_j$ using an optical signal at wavelength $\lambda_i$;

an acknowledgement means residing at node $N_j$ for notifying node $N_i$ that said message is received;

whereby said acknowledgement means is a data message impressed on a subcarrier multiplexed tone unique to node $N_i$.

* * * * *